United States Patent [19]
Avramidis

[11] 3,845,666
[45] Nov. 5, 1974

[54] MULTI-SPEED MOTION TRANSMITTING MECHANISM

[75] Inventor: Stellios Antony Avramidis, Greenfield, Ind.

[73] Assignee: FMC Corporation, San Jose, Calif.

[22] Filed: Oct. 2, 1972

[21] Appl. No.: 294,410

[52] U.S. Cl............. 74/336, 123/41.11, 192/104 R
[51] Int. Cl. ...... F16h 5/46, F16d 43/08, F01p 7/04
[58] Field of Search........ 74/336; 192/48.92, 104 R; 123/41.11

[56] References Cited
UNITED STATES PATENTS

| | | | |
|---|---|---|---|
| 1,357,403 | 11/1920 | Kimble........................... | 192/104 R |
| 1,795,135 | 3/1931 | Molly................................... | 74/336 |
| 2,219,812 | 10/1940 | Hochstetter......................... | 74/336 |
| 2,911,961 | 11/1959 | McRae........................... | 74/336 UX |
| 2,911,962 | 11/1959 | McRae........................... | 73/336 UX |
| 3,019,874 | 2/1962 | Heckethorn................. | 192/48.92 X |
| 3,463,100 | 3/1949 | Gredell........................... | 74/336 X |
| 3,666,065 | 5/1972 | Schmidt...................... | 192/104 R X |

*Primary Examiner*—Allan D. Herrmann
*Attorney, Agent, or Firm*—J. F. Verhoeven; C. E. Tripp

[57] ABSTRACT

A two-speed motion transmitting mechanism is disclosed in which an input shaft has an input sprocket and an overrunning clutch mounted thereon. The input sprocket is connected by a first endless chain to a sprocket mounted on a centrifugal clutch which, in turn, is mounted on an auxiliary shaft. A second chain connects a sprocket mounted on the auxiliary shaft to an output sprocket mounted on the overrunning clutch. Initially, the drive from the input shaft is effected through the first and second chain to the output sprocket. After a predetermined speed is reached, the drive from the input shaft is effected through the overrunning clutch to the output sprocket.

2 Claims, 7 Drawing Figures

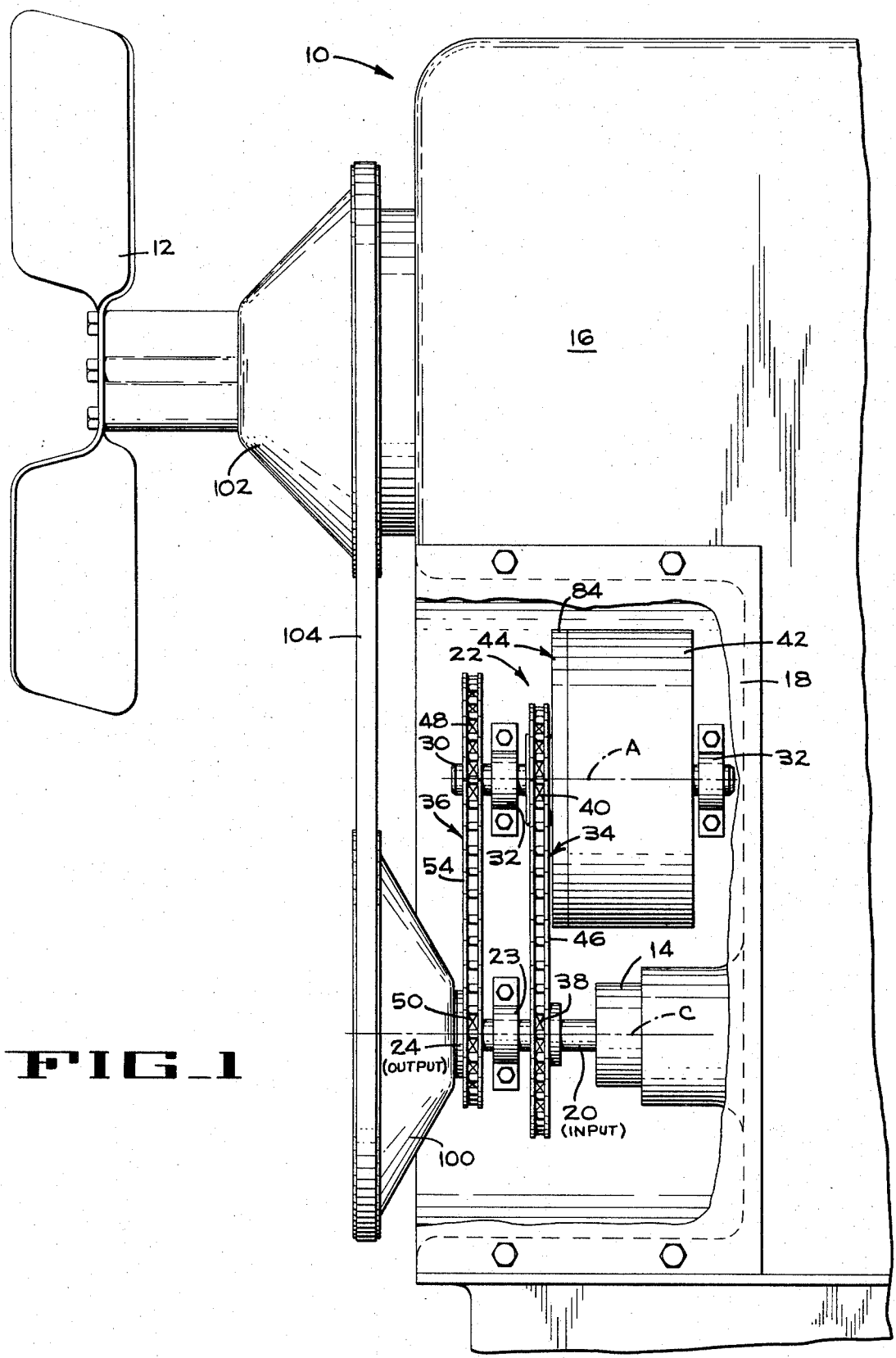
FIG_1

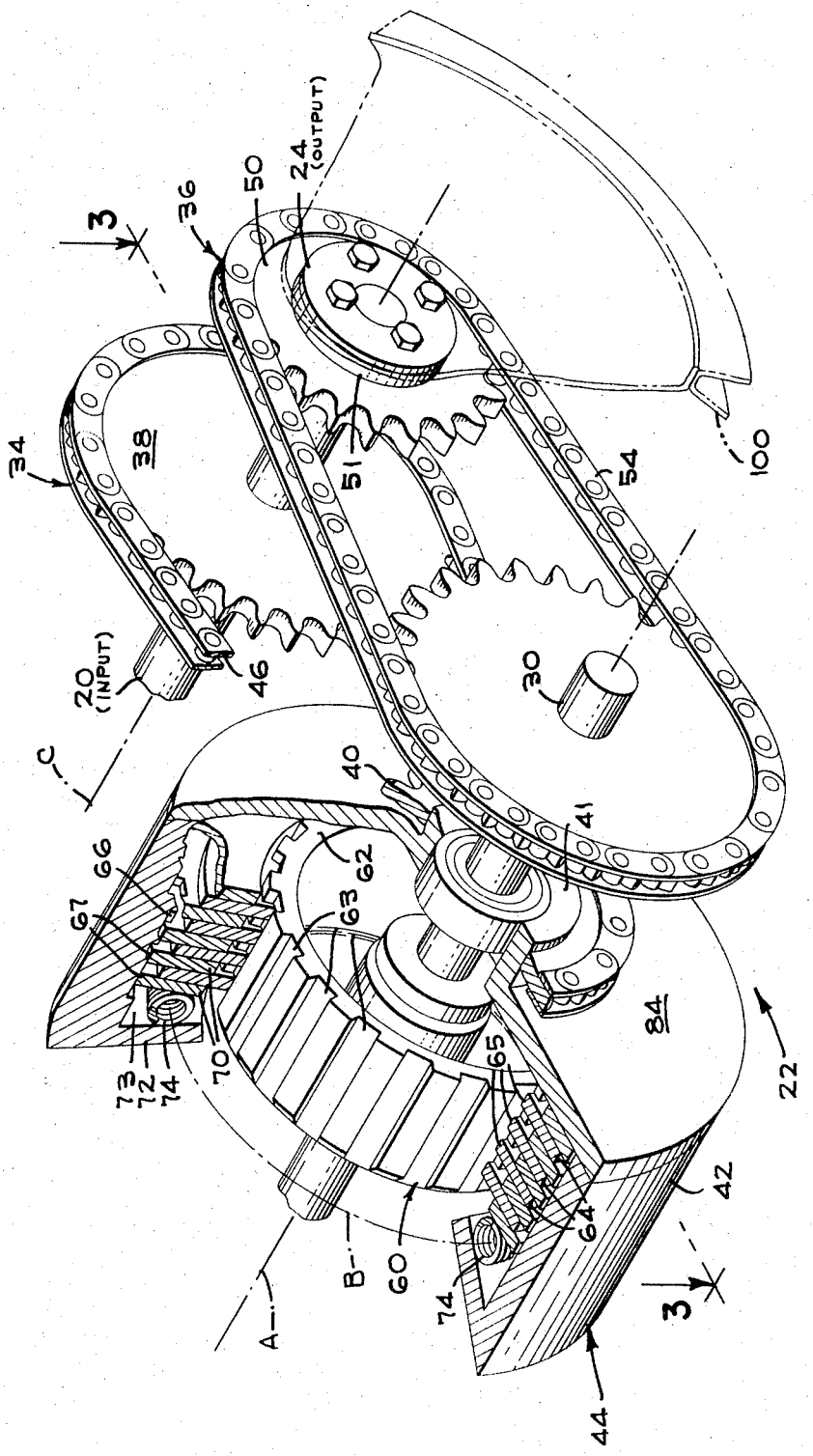

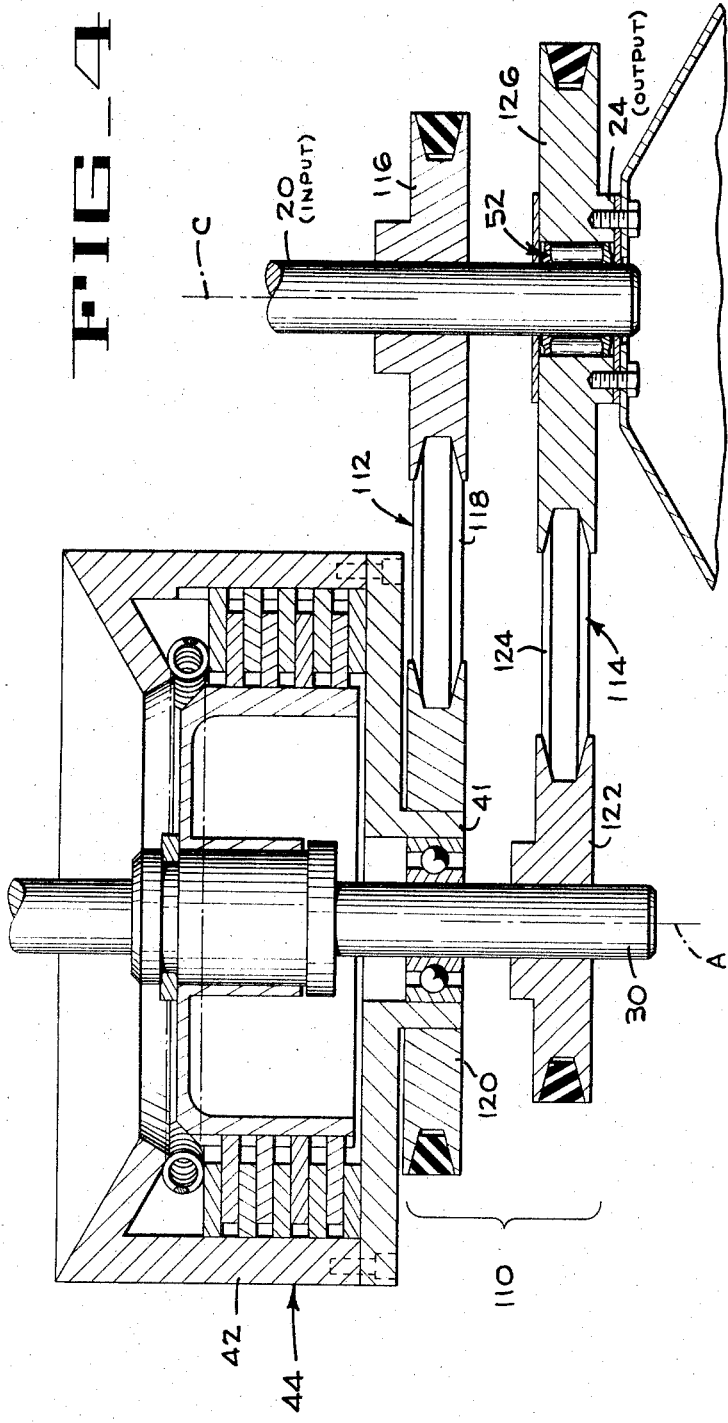

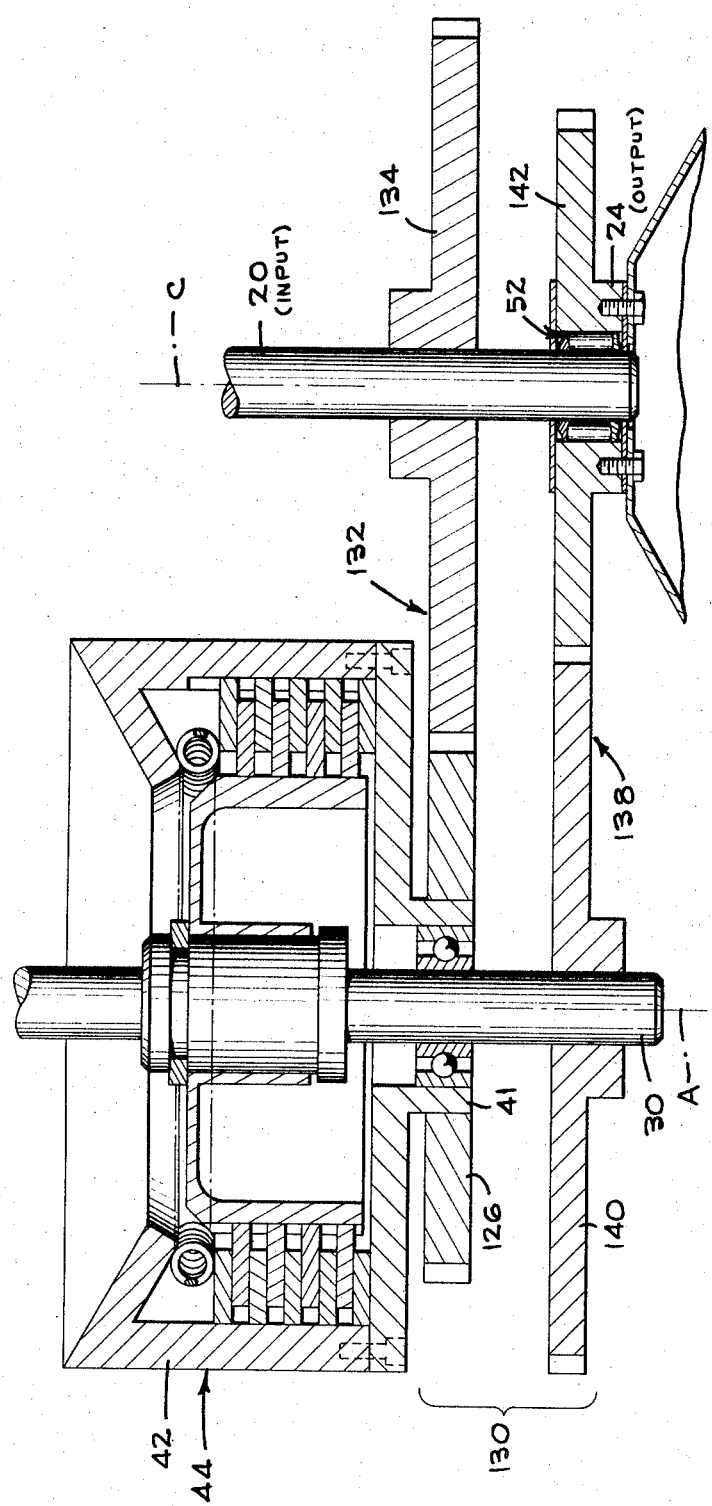

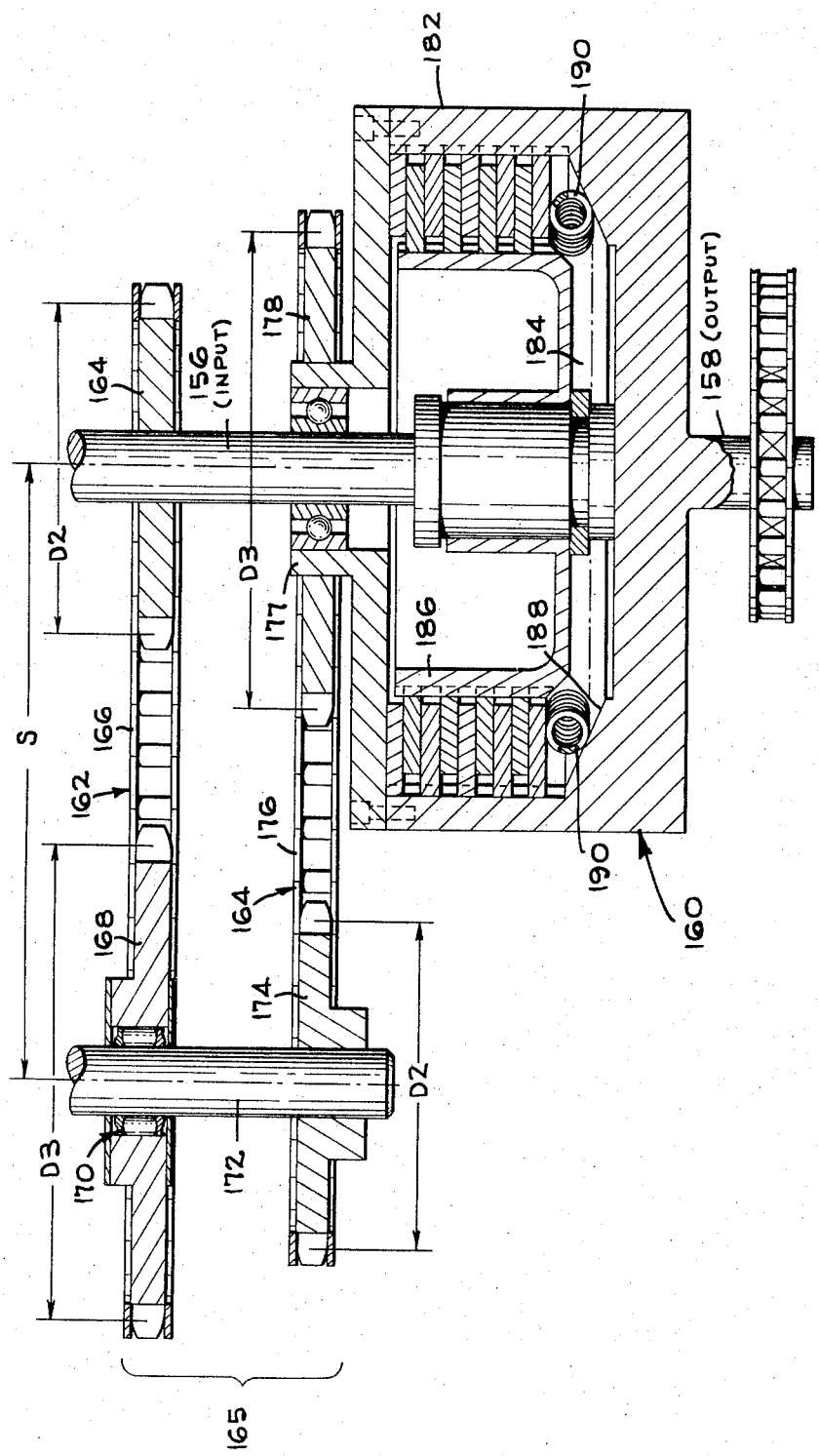

MULTI-SPEED MOTION TRANSMITTING MECHANISM

BACKGROUND OF THE INVENTION

The present invention relates to motion transmitting mechanisms, and, more specifically, to multispeed motion transmitting mechanisms.

Multi-speed motion transmitting mechanisms which will automatically change the speed of an output member in response to the speed of an input member, or in response to the speed of the output member, are well known in the field of mechanical drives. One of the many applications for this type of drive is in power driven vehicles, not only for the drive of the vehicle itself, but also for accessory equipment used on the vehicle. For example, it is known to use a two-speed drive for auto accessories, which have an optimum operating speed, to compensate for the wide range of speeds at which the engine is run. Typical automotive two-speed accessory drives are shown in U.S. Pat. Nos. 24,309, 2,860,519, 2,866,349, 2,903,083, 2,955,478, 3,096,662, and 3,596,524.

In general, the prior art two-speed drives consist of an input member, an output member, and at least two drive trains connected in parallel between these members. A centrifugal clutch is inserted in one of said drive trains and an overruning clutch is inserted in the other drive chain so that at any given speed of operation of the input member (which is connected to the automobile engine), one or the other of the drive trains is connected between the input member and the output member, but not both. The drive trains produce different speed ratios between the input and output member so that initially, when the engine speed is low, the accessory (which constitutes the output member or is driven from the output member) is driven, through the drive train having the centrifugal clutch, at a higher speed ratio. At that time, the other drive train is ineffective because the overrunning clutch overruns the output member. When the engine speed is higher, the centrifugal clutch is disengaged to render the drive train with the centrifugal clutch ineffective, and the output member is then driven through the overruning clutch at a lower speed ratio.

SUMMARY OF THE INVENTION

In the present invention, two motion transmitting trains are provided between an input member and an output member (as in the prior art), but the motion transmitting trains of the present invention are connected in series, not in parallel, between the input member and the output member. Power is transmitted from the input member to the output member through the series connected trains, during only one phase, or speed range, of operation of the engine. In the other phase of operation, the input and output members are connected, but not through either motion transmitting train.

In brief, in the preferred form of the invention an input member, such as a shaft, is mounted coaxially with an output member, which may, for example, be a hub. An auxiliary shaft has a centrifugal clutch with a sprocket mounted thereon which is connected by chain to a sprocket on the input member. The auxiliary shaft also has a sprocket mounted directly thereon which is connected by chain to a sprocket on the output member. The output sprocket is mounted on an overruning clutch which, in turn, is mounted on the input shaft. Thus, there is provided a first motion transmitting train between the input member and the auxiliary member and a second motion transmitting train between the auxiliary member and the output member, the two trains together defining a driving connection between the input member and the output member.

Rotation of the output member is effected by the driving connection between the input member and the output member defined by the two series connected motion transmitting trains, in one embodiment of the present invention, while the engine is operated below a predetermined speed. At this time, the output member is rotating faster than the input shaft by virtue of the overrunning clutch by which the output member is mounted on the input shaft.

After the engine reaches said predetermined speed, the centrifugal clutch, which is normally engaged, becomes disengaged to break the driving connection from the input member to the output member through the two motion transmitting trains. Thereafter, the output member is picked up, through the overrunning clutch, by the input member to run the output member at the same rotary speed as the input member. Auto accessories may be driven from the output member.

In the device disclosed herein, each of the two driving trains, which are connected in series, may produce identical speed ratios. This is advantageous because, in a chain drive, not only are the sprockets of the respective driving trains on the same centers, but the sprockets are also of the same size and will utilize chains of identical length. In the prior art devices, although the sprockets of the respective drive trains were on the same centers, they were not of the same size, nor were the chains of identical length, because different ratios were required of the two parallel motion transmitting trains. Thus, in the prior art devices, it was difficult to fit chains of different length to the identically spaced sprockets of the parallel motion transmitting trains.

Another advantage of the two-speed motion transmitting mechanism of the present invention is that all speed reduction required during one phase of engine operation need not be achieved in one of the motion transmitting trains. since the two trains are connected in series, and not in parallel, only a portion (as, for example, one-half) of the reduction need be taken in each motion transmitting train. Thus, the motion transmitting mechanism can be more compact than mechanism with parallel trains.

It is therefore one object of the present invention to provide an improved multi-speed motion transmitting mechanism suitable for transmitting motion at desired speed ratios.

It is another object of the present invention to provide a two-speed motion transmitting mechanism in which an output member is driven directly by an input member at one of the speeds.

It is yet another object of the present invention to provide a two-speed motion transmitting mechanism in which two motion transmitting trains, producing like speed ratios, are used.

It is still another object of the present invention to provide a motion transmitting mechanism in which the output member is mounted coaxially with the input member.

BRIEF DESCRIPTION OF THE DRAWINGS

FIG. 1 is a schematic diagram of the motion transmitting mechanism of the present invention employed in the drive of an automobile fan.

FIG. 2 is a view in perspective of the motion transmitting mechanism of FIG. 1.

FIG. 4 is a view taken as the view of FIG. 3 showing belt instead of chain drive trains.

FIG. 5 is a view taken as the view of FIG. 3 showing gear trains instead of chain drive trains.

FIG. 6 is a schematic diagram of another embodiment of the motion transmitting mechanism of the present invention.

DESCRIPTION OF THE PREFERRED EMBODIMENTS

Figure 7:
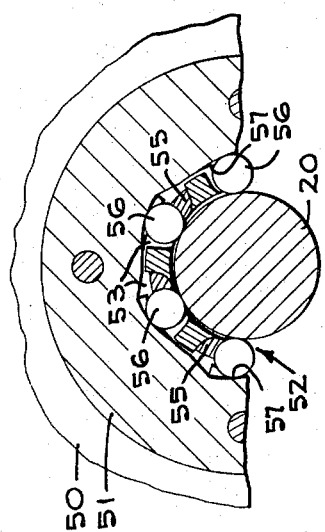
FIG. 7 is a cross-sectional view taken on the line 7—7 of FIG. 3.

There is shown in FIG. 1 the multi-speed motion transmitting mechanism of the present invention as utilized with an automobile engine 10 to drive an automobile accessory, which, for illustrative purposes, is shown as fan 12, but which may be any other automobile accessory, such as a generator, water pump, or air conditioning compressor. The engine crankshaft 14 extends from the engine block 16 into a housing 18 which is connected to the block 16. The crankshaft has an integral extension 20 which defines an input member for the motion transmitting mechanism 22 carried inside housing 18. Crankshaft extension 20 is supported in the housing by bearing 23.

The motion transmitting mechanism 22 operates to drive, at either of two speed ratios, an output member 24 which is co-axial with input member 20. The motion transmitting mechanism includes an auxiliary shaft 30 rotatably mounted in bearings 32 which are secured in housing 18. The mechanism 22 also includes a first motion transmitting train 34 which extends between the input member 20 (which is on an axis C) and the auxiliary shaft 30 (which is on an axis A) and a second motion transmitting train 36 which extends between the auxiliary shaft 30 (on axis A) and the output member 24 (on axis C).

Figure 3:
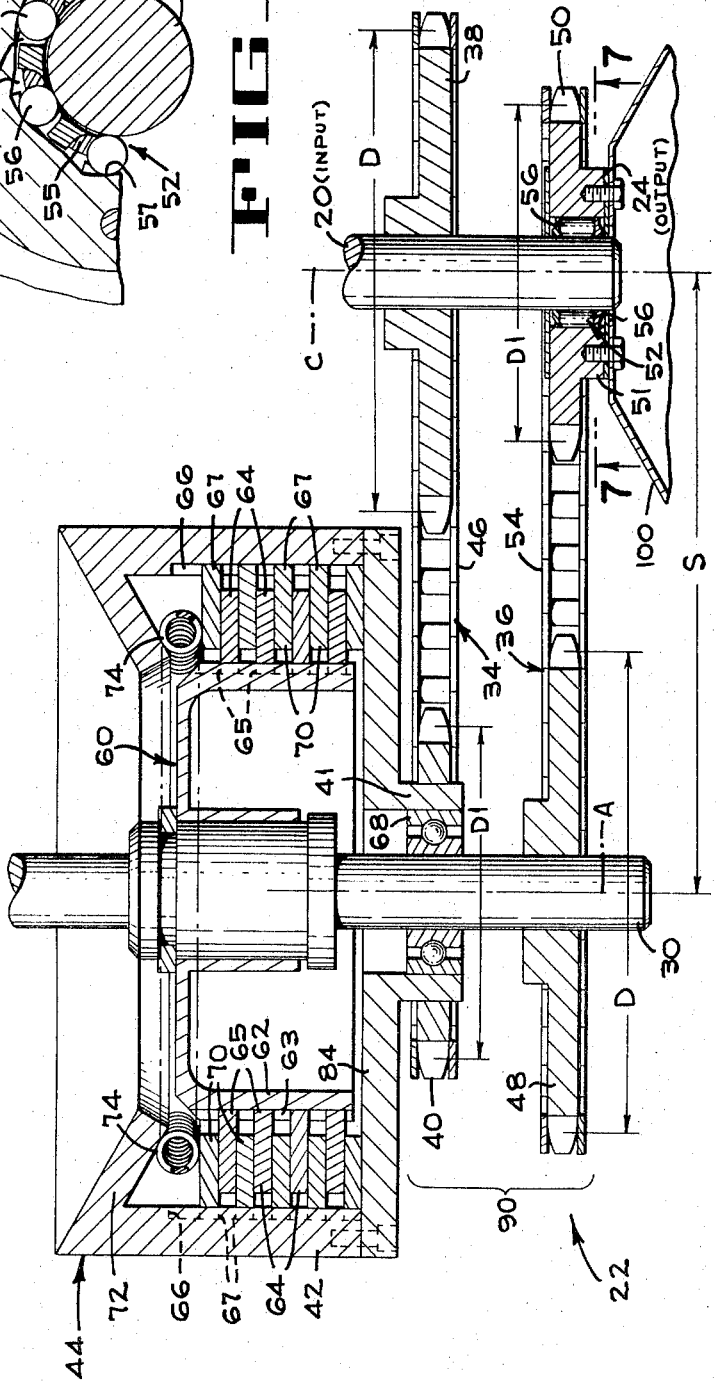
FIG. 3 is a view taken on the lines 3—3 of FIG. 2.

The first motion transmitting train 34, as shown best in FIG. 3, consists of a sprocket 38 secured to input shaft 20, a sprocket 40 secured to the hub portion 41 on the outer member 42 of a centrifugal clutch 44, and an endless chain 46 mounted on sprockets 38 and 40. The second motion transmitting train 36, as shown also in FIG. 3, consists of a sprocket 48 secured to the auxiliary shaft 30, a sprocket 50 integral with the outer portion 51 of an overrunning clutch 52 mounted on the input shaft 20, and a chain 54 mounted between sprockets 48 and 50.

The centrifugal clutch 44 is shown best in FIGS. 2 and 3. The inner portion 60 of the clutch, which is secured to auxiliary shaft 30, consists of a hub 62 with a plurality of angularly spaced longitudinal grooves 63 therein. A plurality of annular longitudinally spaced plates 64 have inner projections 65 which are received in the outer grooves 63 of the hub. The outer member 42 of the clutch 44 consists of a cup-shaped member mounted on shaft 30 through anti-friction bearing 68. The cup-shaped member has a plurality of angularly spaced longitudinal grooves 66 in the inner surface thereof. A plurality of annular longitudinally spaced plates 70 have outer projections 67 which are received in grooves 66. The plates 70 mesh in staggered relation with the plates 64 of the clutch member 62. The outer member 42 of the clutch has an inward flange 72 at one end which is inclined with respect to the longitudinal axis A of shaft 30. A coiled spring 74, which is formed in a circle B, is received in the space 73 between flange 72 and the end plate 70. The spring 74 is normally drawn, by the tension in the spring, toward the axis A. The grooves 63, 66 extend parallel to axis A so that the plates 64, 70 can slide along axis A, but cannot rotate with respect to the clutch members on which they are mounted by virtue of the projections in the grooves. Thus, when the spring 74 is normally urged inward by the tension in the spring, the plates, are urged to the right, as viewed in FIG. 2, until the plates are held in tightly stacked relation against the radial wall 84 (which is detachable to permit assembly of the clutch) of cup-shaped member 42.

The overrunning clutch 52 has pockets 53 with retainer springs 55 and rollers 56 therein as shown in FIG. 7. The upper surfaces 57 of the pockets (defined by the inner portion of sprocket 50) are inclined to define wedge surfaces. When the sprocket 50 is driven clockwise (as viewed in FIG. 7) relative to shaft 20, or shaft 20 is driven counterclockwise relative to sprocket 50, the rollers 56 become wedged against surfaces 57 and sprocket 50 and shaft 20 becomes locked for rotation together. When sprocket 50 is driven counterclockwise with respect to shaft 20, or shaft 20, is driven clockwise with respect to sprocket 50, the rollers are freed from the wedge surfaces and relative rotation between the shaft and sprocket can take place.

The outer member 42 of the centrifugal clutch 44 is rotated continuously (while engine 10 is operating) by the first motion transmitting train 34 (sprocket 38, chain 46, sprocket 40). Normally (that is, up to a predetermined engine speed and a predetermined speed of outer clutch member 42), the clutch plates 64, 70 are engaged to rotate the auxiliary shaft 30. With the auxiliary shaft 30 rotating, the second motion transmitting train 36 (sprocket 48, chain 54, sprocket 50) drives output member 24, which is a hub integral with sprocket 50. At this time, the output member 24 (and sprocket 50 of which it is a part) rotates faster than input shaft 20 because the input sprockets 38, 48 of each train are larger than the output sprockets 40, 50 thereof. A speed of the output member 24 greater than the speed of input shaft 20 is possible by virtue of the overrunning clutch 52 which is interposed between shaft 20 and output member 24. Preferably, the sprockets 38, 48 are of the same diameter and the sprockets 40, 50 are of the same diameter so that the trains are identical, to facilitate mounting the trains between the same axes C and A.

Since motion is transmitted through the first motion transmitting train 34 and the second transmitting train 36 in sequence, the two trains may be considered to be connected in series. It will be noted that, as in any series connection, both motion transmitting trains must be effective or no motion will be transmitted from the input member to the output member. Unlike parallel connected trains, the first and second trains are not alternatively effective. On the contrary, in the mechanism disclosed herein, neither or both are effective. Thus, under the condition of operation when both trains are effective (that is, when the engine is operated below a predetermined speed), the output member 24 is driven from the input member 20 through the series connected motion transmitting trains 34 and 36.

When the engine speed (and consequently the speed of rotation of input member 20) rises above a predetermined level, the circular spring 74 of centrifugal clutch 44 moves outwardly in clutch member 42. The force exerted on the clutch plates is relaxed because the angle of flange 72 permits the spring to move away from the clutch plates 64, 70. The two sets 64 and 70 of clutch plates accordingly become disengaged, disengaging the outer member 42 from the inner member 60 of the centrifugal clutch. Thus, the outer clutch member 42 rotates freely on bearing 68 but without transmitting any motion to inner clutch member 60 and shaft 30. The disengagement of centrifugal clutch 44 serves to break the drive connection 90, defined by the series connected motion transmitting brains 34 and 36, between the input member 20 and the output member 24.

It should be noted that, in the embodiment of the invention illustrated in FIGS. 1, 2 and 3, driving train 34 is similar to driving train 36 in regard to the diameter of the sprockets and in regard to the spacings between the axes A and C on which the sprockets are mounted. The input sprocket (38, 48) of each train has a diameter D, the output sprocket (40, 50) of each train has a diameter D1, and the spacing between the two sprockets of each is S. Accordingly, the chains 36 and 54 of the two trains are identical in length. The spacing S between the sprockets of each train can be selected to accommodate the parameters of each train, without compromise, since both trains are identical in every respect. Thus, the first train 34 produces a speed in auxiliary shaft 30 which is at a ratio R (greater than one in this embodiment of the invention) with respect to the speed of input shaft 20, and the second train 36 produces the same ratio R in the output member 24 relative to the speed of the auxiliary shaft 30. Thus, the speed ratio of the output member to the input member is $R \times R$, or $R^2$.

The output member 24 is a hub integral with sprocket 50 which is mounted through overrunning clutch 52 on the shaft 20. By virtue of the overrunning clutch, the sprocket 50 (and hub 24 thereof) can run freely on shaft 20 at $R^2$ times the speed of shaft 20, to drive output hub 24 at $R^2$ times the speed of shaft 20, while the engine speed remains below the predetermined speed at which the drive connection 90 is broken. When the engine reaches the predetermined speed to disengage the plates of the centrifugal clutch and break the drive connection 90, the output member will slow down until the rotary speed of the output member (and sprocket 50) equals the rotary speed of input shaft 20. Thereafter, the shaft 20 will drive the sprocket 50 and output member 24 through the overrunning clutch 52 at the same speed as the input member.

In the embodiment of FIG. 1, the hub 24 has a pulley 100 thereon which drives a fan pulley 102 through belt 104. Other accessories, such as a generator or a water pump, could also be driven off hub 24.

Thus, it will be seen that while the engine is at a low speed, the fan 12 is driven at a speed which is high relative to the engine speed, but when the engine speeds up, the fan is driven at a speed which is lower relative to the engine speed. The change of speed ratio from a higher ratio to a lower ratio as the engine speed changes from a low speed to a higher speed, tends to keep the speed range of the fan narrower than the speed range of the engine, to produce a more constant cooling effect on the engine.

As illustrated in FIGS. 4 and 5 (wherein numerals identical to numerals used in FIGS. 1 to 3 indicate elements identical to those in FIGS. 1 to 3), other motion transmitting trains can be used in the present invention. For example, in FIG. 4, a drive connection 110 is shown between the input member 20 and the output member 24. The drive connection consists of a first motion transmitting train 112 extending between input member 20 and auxiliary shaft 30, and a second motion transmitting train 114 extending between auxiliary shaft 30 and output member 24. The first motion transmitting train 112 consists of a pulley 116 secured to shaft 20, a pulley 120 mounted on the hub portion 41 of outer member 42 of centrifugal clutch 44, and an endless belt 118 mounted on the pulleys 116, 120. The second motion transmitting train 114 consists of pulley 122 secured to auxiliary shaft 30, pulley 126 mounted on overrunning clutch 52 and integral with output hub member 24, and belt 124 mounted on pulleys 122, 126. In this embodiment the diameter of pulley 116 may equal the diameter of pulley 122 and the diameter of pulley 120 may equal the diameter of pulley 126. With this construction the driving trains 112 and 114, which both extend between the same shafts 20 and 30, will be identical.

In FIG. 5, the first motion transmitting train 132 of drive connection 130 (extending between input member 20 and output member 24) consists of gear 134 secured to shaft 20 and meshing gear 126 secured to the hub portion 41 of the outer member 42 of centrifugal clutch 44. The second motion transmitting train 138 (which may be identical to motion transmitting train 132) consists of gear 140 secured to auxiliary shaft 30 and meshing gear 142 mounted on overrunning clutch 52 and integral with output member 24.

There is shown in FIG. 6, a different embodiment of the invention. In this embodiment, shaft 156 defines the input shaft for the motion transmitting mechanism and the hub 158 of centrifugal clutch 160 defines he output member therefor.

As in the previously described embodiments of the invention, there are two motion transmitting trains 162, 164 arrayed in series to define a drive connection 165 between the input member 156 and the output member 158. The first motion transmitting train 162 consists of a sprocket 164 secured to input shaft 156, an endless chain 166, and a sprocket 168. The sprocket 168 is mounted on an overrunning clutch 170 which is mounted on auxiliary shaft 172. The overrunning clutch 170 may be similar in construction to overrunning clutch 52. The second motion transmitting train 164 consists of a sprocket 174 secured to auxiliary shaft 172, an endless chain 176, and a sprocket 178 secured on the hub portion 177 of the outer member 182 of centrifugal clutch 160. Output member 158 is integral with clutch member 182 and hub portion 177. As in the previously described embodiments, the spacing S between sprockets in the respective trains is identical and the diameters D2 and D3 of corresponding sprockets are identical. Since the diameters of the corresponding sprockets of the two trains, and the spacing between the sprockets of the two trains, are identical, the length of the two chains are identical. The ratio R1 of the diameter D2 of the input sprocket to the diameter D3 of the output sprocket of each train is less than one. Therefore, the transmission of motion from shaft 156 to shaft 172 through the first train results in a lower speed for shaft 172 than shaft 156 and the transmission of motion from shaft 172 to output member 158 results in a lower speed for output member 158 compared to auxiliary shaft 172. Hence, the speed of output member 158 is $R1^2$ times the speed of input shaft 156 when the output member is driven through the drive connection 165 defined by the series connected first and second motion transmitting train.

The centrifugal clutch 160 is similar in many respects to the centrifugal clutch 44 previously described and will not be described in detail except as it differs from clutch 44. Clutch 160, however, is operated in response to the speed of the inner member 186 of the clutch, instead of in response to the speed of the outer member of the clutch as in clutch 44. The outer member 182 of the clutch is integral with hub member 177 and output member 158, and encloses a chamber 184 which houses the inner clutch member 186. The outer member has an inner inclined surface 188 against which a circular spring 190, similar to spring 74, seats. Normally, while the inner member 186 is rotating below a predetermined speed, the tension in the spring pulls the spring radially inwardly, and the clutch plates of the clutch (which are constructed and operate similarly to the clutch plates of clutch 44) are disengaged.

At low engine speed, because the two members of centrifugal clutch 160 are disengaged, drive of the output member 158 (and hence member 182) occurs through the first motion transmitting train 162, over-running clutch 170, auxiliary shaft 172, and the second motion transmitting train 164.

When the engine speed is increased to increase the speed of the inner member 186 of centrifugal clutch 160 to a predetermined speed, the spring 190 moves outwardly, pressing the clutch plates together by virtue of the camming action of wedge surface 188, to engage the inner member 186 of the centrifugal clutch with the outer member thereof. When this engagement occurs, the drive of the output member is effected directly from input shaft 156 to inner clutch member 186, outer clutch member 182, to output member 158. The over-running characteristic of clutch 170 frees the sprocket 168 from auxiliary shaft 172 and the drive trains continue to run, but without pulling any load.

Although the best mode contemplated for carrying out the present invention has been herein shown and described, it will be apparent that modification and variation may be made without departing from what is regarded to be the subject matter of the invention.

What is claimed is:

1. A multi-speed motion transmitting mechanism comprising in combination: an input member mounted on an axis, an output member mounted on said axis, an auxiliary member, a normally engaged centrifugal clutch mounted on said auxiliary member, a first endless flexible motion transmitting member mounted between said input member and said centrifugal clutch to establish a driving connection between said input member and said auxiliary member when the speed of said input member is below a predetermined speed, a second endless flexible motion transmitting member mounted between said auxiliary member and said output member to establish a driving connection between said auxiliary member and said output member when said input member is below a predetermined speed, and an overrunning clutch on said axis between said input member and said output member to connect said output member directly to said input member for rotation at the same speed when said centrifugal clutch disengages as said input member reaches a predetermined speed.

2. A multi-speed motion transmitting mechanism comprising in combination: an input shaft, an input sprocket secured to the input shaft, an overrunning clutch mounted on the input shaft, an output sprocket mounted on said overrunning clutch, an auxiliary shaft, a normally engaged centrifugal clutch mounted on said auxiliary shaft, a sprocket mounted on said centrifugal clutch, a chain mounted between said input sprocket and the sprocket on said centrifugal clutch, a sprocket on said auxiliary shaft, and a chain mounted between the sprocket on said auxiliary shaft and the output sprocket.

* * * * *